United States Patent Office 3,651,043
Patented Mar. 21, 1972

3,651,043
AGAROSE BASED ANION EXCHANGERS
Horst D. Schell and Victor F. Ghetie, Bucharest, Rumania, assignors to Institutul de Biochimie, Bucharest, Rumania
No Drawing. Filed Apr. 1, 1969, Ser. No. 812,423
Claims priority, application Rumania, Mar. 30, 1968, 57,505
Int. Cl. C07c 47/18
U.S. Cl. 260—209 R      5 Claims

ABSTRACT OF THE DISCLOSURE

The present invention deals with the synthesis of new basic ion exchangers of medium strength derived from agarose.

The procedure for obtaining these derivatives, according to the invention, consists in reacting simple or glyceric bridge cross-linked agarose with an equimolecular mixture of epichlorhydrin and triethanolamine.

---

The present invention describes new synthetic derivatives of agarose applicable in ion-exchanging chromatographic analysis. These synthetic derivatives find applications over a wide field, viz. for the investigation, isolation and purification of a large number of compounds such as: viruses, proteins, nucleic acids, enzymes and others.

Similar products destined for similar purposes are known, however, deriving from cellulose.

The present invention extends the range of products usable in chromatographic analysis by achieving new basic ion-exchangers of medium strength.

The procedure for obtaining these derivatives, according to the invention, consists in reacting simple or glyceric bridge cross-linked agarose with an equimolecular mixture of epichlorhydrin and triethanolamine (ECTEOLA). Such cross-linked agarose is prepared, e.g., according to U.S. Pat. 3,507,851.

Two examples of the invention are given as follows:

EXAMPLE 1

10 g. agarose are introduced into 35 ml. 10 N sodium hydroxide solution, chilled down to about 0° C. After homogenization for about 60 minutes, a previously prepared and chilled mixture consisting of 14 g. epichlorhydrin and 8.7 g. triethanolamine is added, in two or three portions the reaction mixture being each time homogenized. Then, the vessel containing the reaction mixture is warmed on a water bath having a temperature of 75–80° C. After 30 minutes the gel is mechanically ground and broken up, washed with water on a filter funnel, then with 0.5 N sodium hydroxide, with 0.5 N hydrochloric acid and again with 0.5 N sodium hydroxide. The mass on the filter is suspended in 800 ml. of distilled water and left over night in a refrigerator. The next day the supernatant is decanted, the reaction product is washed until complete hydroxide removal, dehydrated with ethanol or/and acetone, and dried. 10 g. of ion exchanger (ECTEOLA-agarose) are obtained, having a content of basic groups of about 0.7 mequiv./g.

EXAMPLE 2

Example 1 is repeated using, however, cross-linked agarose (agarose X-7.5 of 50–100 mesh), instead of simple agarose. About 11 g. final product (ECTEOLA-agarose X) is obtained, having a content of approximately 0.7 mequiv./g. basic groups.

Derivatives obtained, according to the present invention, are insoluble even in hot aqueous solutions. Their gels are first mechanically broken up, then dehydrated, dried and selectively passed through a sieve, in order to isolate particles of desired sizes.

The present invention has the advantage, that by the reaction of the above two agarose types with an equimolecular mixture of epichlorohydrin and triethanolamine, new basic ion exchangers of middle strength are obtained, particularly suited for the study, separation and purification of ribo-, and deoxyribonucleic acids, of nucleopeptides, nucleotides, nucleoproteins, different enzymes, etc.

We claim:
1. An agarose-derived product selected from the group consisting of ECTEOLA-agarose and cross-linked ECTEOLA-agarose.
2. Basic ion exchanger consisting of ECTEOLA-agarose according to claim 1 as gel in particulate form.
3. Basic ion exchanger consisting of ECTEOLA-agarose cross-linked according to claim 1 as gel in particulate form.
4. A process for obtaining agarose derivatives according to claim 1 having application in ion-exchanging chromatography, comprising admixing agarose in an alkaline medium with an equimolecular mixture of epichlorohydrin and triethanolamine and heating the resultant at 75–80° C. for 30 minutes, whereby compounds are obtained, which are insoluble even in hot aqueous solutions and which are endowed with basic ion-exchanging properties.
5. A process for obtaining agarose derivatives according to claim 1 having application in ion-exchanging chromatography, comprising admixing glyceric-bridge cross-linked agarose with an equimolecular mixture of epichlorohydrin and triethanolamine in alkaline medium and heating the resultant at 75–80° C. for 30 minutes, whereby compounds are obtained, which are insoluble even in hot aqueous solutions and which are endowed with basic ion-exchanging properties.

References Cited

UNITED STATES PATENTS 3,247,048    4/1966    Gaertner            260—209
3,277,025   10/1966    Flodin et al.       260—209

LEWIS GOTTS, Primary Examiner

J. R. BROWN, Assistant Examiner

U.S. Cl. X.R.

260—2.1 R